United States Patent [19]

Korenberg et al.

[11] Patent Number: 5,199,922

[45] Date of Patent: Apr. 6, 1993

[54] CUTTING DEVICE

[75] Inventors: Hendrik J. Korenberg; Hendrik J. Pardijs, both of Winterswijk; Fransiscus E. Pruijs, Azewijn, all of Netherlands

[73] Assignee: Stork Nijhuis B.V., Lichtenvoorde, Netherlands

[21] Appl. No.: 811,245

[22] Filed: Dec. 20, 1991

[30] Foreign Application Priority Data

Dec. 21, 1990 [NL] Netherlands .......................... 9002861

[51] Int. Cl.⁵ .............................................. A22C 21/06
[52] U.S. Cl. ...................................... 452/122; 452/109; 452/116
[58] Field of Search ................. 452/122, 120, 109, 116

[56] References Cited

U.S. PATENT DOCUMENTS

| 2,795,815 | 6/1957 | Dahlberg . | |
| 3,116,513 | 1/1964 | Ine . | |
| 3,137,031 | 6/1964 | Ine . | |
| 3,147,513 | 9/1964 | Schneider et al. | 452/122 |
| 3,634,908 | 1/1972 | Chamberlain | 452/109 |
| 3,975,796 | 8/1976 | LaBarber | 452/122 |

FOREIGN PATENT DOCUMENTS

| 0258939A | 9/1988 | European Pat. Off. . |
| 1923308 | 11/1970 | Fed. Rep. of Germany . |
| 7303652 | 9/1973 | Netherlands . |
| 7306059 | 11/1974 | Netherlands . |
| WO89/10060 | 11/1989 | PCT Int'l Appl. . |
| 2147190A | 5/1985 | United Kingdom . |

Primary Examiner—Willis Little
Attorney, Agent, or Firm—Willian Brinks Olds Hofer Gilson & Lione

[57] ABSTRACT

A cutting device for arranging a cut around the anus of a slaughtered animal, which cutting device comprises:

a positioning rod for insertion into the anus of a slaughtered animal;

a rotatably drivable cylindrical beaker-shaped knife which is placed coaxially round the positioning rod and whereof the free end is provided with a cutting edge; and pressure means and suction means comprising a conduit extending through the positioning rod, debouching on the peripheral surface of the positioning rod at a distance from the cutting edge and connectable to a pressure source and an underpressure source respectively for generating an overpressure and an underpressure respectively at the position of the debouchment of that conduit.

The device has a pressure conduit and a suction conduit, which conduits are connectable to a pressure source and an underpressure source respectively, which pressure conduit debouches on the peripheral surface of the positioning rod and which suction conduit debouches in the space bounded by the beaker-shaped knife.

36 Claims, 1 Drawing Sheet

CUTTING DEVICE

BACKGROUND OF THE INVENTION

The invention relates to a cutting device for arranging a cut around the anus of a slaughtered animal, which cutting device comprises:

a positioning rod for insertion into the anus of a slaughtered animal;

a rotatably drivable cylindrical beaker-shaped knife which is placed coaxially round the positioning rod and whereof the free end is provided with a cutting edge; and pressure means and suction means comprising a conduit extending through the positioning rod, debouching on the peripheral surface of the positioning rod at a distance from the cutting edge and connectable to a pressure source and an underpressure source respectively for generating an overpressure and an underpressure respectively at the position of the debouchment of that conduit.

Such a device is known from NL-A-73 06059. In this known device a conduit debouches on the peripheral surface of the positioning pin which is alternately connectable to an underpressure source and a pressure source. The cut away anus of a slaughtered animal, particularly poultry, can first be sucked fixedly and subsequently removed form the device by energizing the pressurized air source.

The drawback to the known device can be that feces still come out of the anus, whereby the sterility of the slaughtered animal is lost. Feces that may still be adhering to the positioning rod can also find their way onto or into the slaughtered animal. This could be prevented by removing the cutting device very carefully. In the rather rough and ready slaughterhouse business this is however not really possible.

It is therefore the object of the invention to provide a cutting device of the type referred to in the preamble wherein it is ensured that the slaughtered animal is not contaminated during removal of the cutting device.

This is achieved according to the invention with a device having a pressure conduit and a suction conduit, which conduits are connectable to a pressure source and an underpressure source respectively, which pressure conduit debouches on the peripheral surface of the positioning rod and which suction conduit debouches in the space bounded by the beaker-shaped knife.

The suction conduit can debouch on the inner surface of the knife or on the peripheral surface of the positioning rod.

In this latter case the device can have the feature that the pressure conduit and the suction conduit debouch at a mutual axial distance on the peripheral surface of the positioning rod.

It is noted that the debouchments of the conduits can take a multiple form and be placed for instance in distributed manner.

By actuating the pressure source which can generate a gaseous or liquid medium an overpressure can be excited in the space between the positioning rod and the rectum, whereby fecal remnants are pressed into the rectum. Fecal remnants arriving at the embouchement of the suction conduit can thus be removed from the space bounded by the knife. If desired, this removing can be stimulated by energizing the underpressure source. After completing the handling of the slaughtered animal the overpressure within the knife can attribute to a ready removing of the animal. It should be noted that the options given here are only alternatives subjected to the user's wishes.

When the cut is made the skin around the anus is held stretched, which has a positive effect on the cutting action. The overpressure generated inside the beaker-shaped knife by the pressure means can also ensure that fecal residues are transported to the suction means. This also reduces the risk of fecal residues dripping out of the beaker-shaped knife.

The device preferably has the feature that the or each debouchment of the pressure conduit is located between the free end of the positioning rod and the or each debouchment of the suction conduit.

A practical embodiment is that wherein the pressure conduit and the suction conduit extend in axial direction through the positioning rod in mutual coaxial relation.

This variant can be characterized by an axial bore in the positioning rod bounding the suction conduit and by a tube placed therein which bounds the pressure conduit and separates the pressure conduit from the suction conduit.

In order to prevent as far as possible damage to the anus of a slaughtered animal the device preferably has the feature that the free end of the positioning rod has a smooth, rounded shape. This embodiment can have the particular feature that the free end of the positioning rod has a rotation-symmetrical widening.

In a subsequent embodiment the device has the feature that the positioning rod has a rotation-symmetrical widening in the region of the debouchments of the pressure conduit and the suction conduit.

Advantageous is that alternative embodiment, in which the widening has a recess in the region of the or each debouchment of the pressure conduit. When the positioning rod is rotated in the anus the debouchment of the pressure conduit hereby remains clear thereof. This avoids damage to the rectum and the anus wall by the edges of the debouchments. At the suction mouth this problem does not occur since the anus wall has a more robust structure there in view of the presence of the sphincter muscle at that location and the transition to the exterior of the animal.

A simple structure is obtained with an embodiment in which the positioning rod and the knife are coupled fixedly to one another. The above description relating to the recessed location of the debouchment of the pressure conduit already relates thereto.

In order to counter imbalance the embodiment is recommended which has the feature that the rotational axis and the axis of inertia mutually coincide.

The invention will now be elucidated with reference to the annexed drawing, in which:

DETAILED DESCRIPTION OF THE PREFERRED EMBODIMENT

Figure 2:
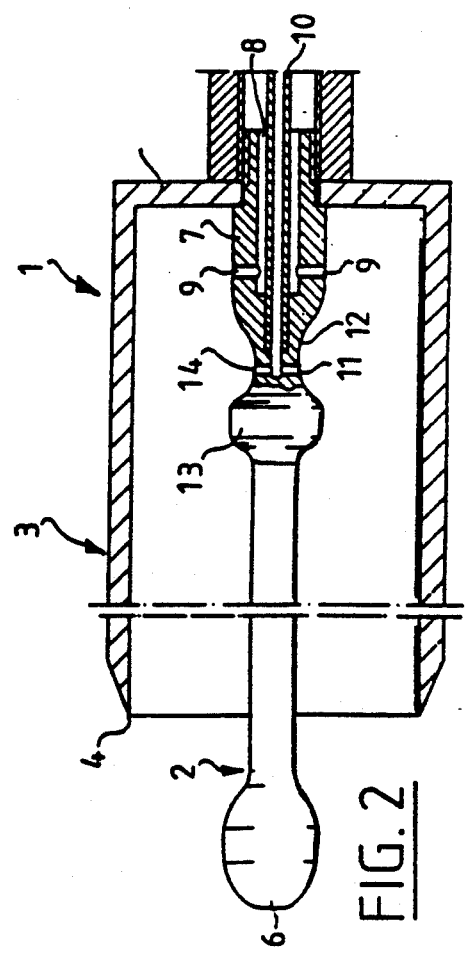
FIG. 2 shows another embodiment in partly broken away side view.

The cutting device 1 according to FIG. 2 comprises a positioning rod 2 in addition to a beaker-shaped knife 3 arranged coaxially therearound. This cylindrical knife 3 is provided on its free leading part with a sharp cutting edge 4 and has on the other side a bottom 5. The positioning rod 2 is fixed to the bottom 5 fixedly and sealingly. The positioning rod 2 carries on its free end a smoothly rounded widening 6 such that it can be introduced into the anus without damaging it.

Since the knife 3 and the positioning rod 2 are fixedly joined to one another the rod 2 turns together with the knife 3 during driving of the device when the rod 2 is inserted into the anus.

The positioning rod 2 has a thickened base portion 7 in which is arranged a bore 8. This latter debouches via continuous holes 9 onto the outer peripheral surface of the base portion 7.

The bore 8 is connected to an underpressure source such that via the holes 9 an underpressure can be generated in the space bounded by the knife and the anus of the slaughtered animal. During the cutting operation by rotating driving round the symmetrical axis of knife 3 an underpressure may, if desired, be maintained such that feces and any flushing liquid coming out of the anus can be discharged via the holes 9 and the bore 8.

Extending inside the bore 8 is a pressure conduit 10 which debouches via holes 11 on the outer peripheral surface of the positioning rod 2. The holes 11 debouch into a constricted portion 12 of the positioning rod 2.

Figure 1:
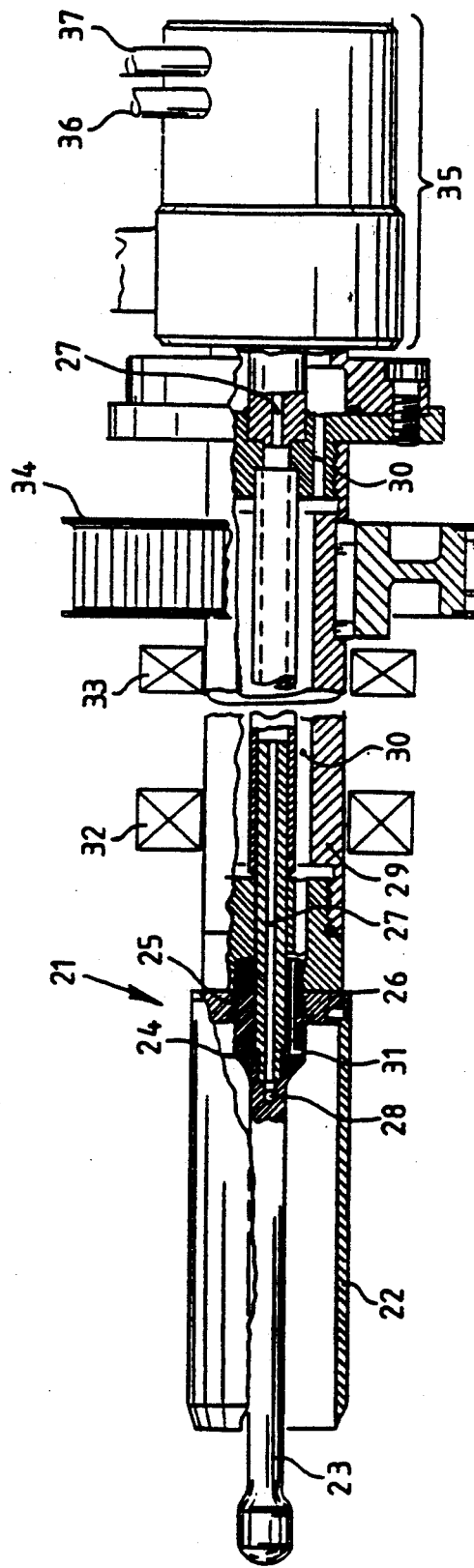
FIG. 1 shows a side view, partly in lengthwise section, of a cutting device according to the invention.

FIG. 1 shows a device 21. This device comprises a cylindrical cutting knife 22, coaxially of which is received a positioning rod 23. This rod is coupled to the bottom 26 of the knife 22 by means of a widened base portion 24 with a screw thread. A central pressure conduit 27 debouches with a spray orifice 28 on the outer surface of the positioning rod 23. This pressure conduit is embodied as a tube which is received in an outer tube 29 which, together with the pressure conduit 27, bounds a suction conduit 30 which is in open communication with a suction orifice 31 on the peripheral surface of the base portion 24. The outer tube 29 is mounted for free rotation in bearings 32, 33. These latter are coupled to a support frame (not drawn). The outer tube 29 also bears a gear wheel 34, using which the device can be rotatably driven by means of a geared belt or the like.

Via a coupling block 35 the rotatably movable pressure conduit 27 and suction conduit 30 are sealingly connected to a fixed pressure conduit 36 and a fixed suction conduit 37. Use is made of a transmission of known type for this purpose.

In an alternative embodiment (not shown) the bottom 5, 26 can be omitted. The positioning rod 23 can in this case be connected to the knife 22 for instance with spokes.

Thus while the invention has been described with respect to particular embodiments, those having skill in the art will recognize modifications in materials, structure and the like which will still fall within the scope of the present invention.

I claim:

1. A cutting device for arranging a cut around an anus of an animal comprising:
   a positioning rod for insertion into the anus of the animal;
   a rotatably drivable cylindrical knife positioned coaxially around the positioning rod, the knife having a free end, the free end having a cutting edge;
   pressure means comprising a pressure conduit extending through the positioning rod and opening on a peripheral surface of the positioning rod at a distance from the cutting edge and connectable to a pressure source to generate a pressure at the opening;
   suction means comprising a suction conduit extending through the positioning rod and opening on a space bounded by the cylindrical knife and connectable to a suction source to generate a suction at the opening wherein the pressure conduit and the suction conduit extend in an axial direction through the positioning rod and the pressure conduit comprises a tube positioned within an axial bore in the positioning rod and the suction conduit is bounded by the positioning rod and the tube.

2. The device of claim 1 wherein the pressure conduit and the suction conduit open at a mutual axial distance on the peripheral surface of the positioning rod.

3. The device of claim 1 wherein the positioning rod has a free end and the opening of the pressure conduit is located between the free end of the positioning rod and the opening of the suction conduit.

4. The device of claim 3 wherein the positioning rod has a rotation-symmetrical widening in the region of the opening of the pressure conduit and in the region of the opening of the suction conduit.

5. The device of claim 4 wherein the widening has a recess in the region of the opening of the pressure conduit.

6. The device of claim 1 wherein the positioning rod has a free end, the free end having a smooth rounded shape.

7. The device of claim 6 wherein the free end has a rotation symmetrical widening.

8. The device of claim 1 wherein the positioning rod and the knife are fixedly coupled to one another.

9. The device of claim 1 further comprising a rotational axis and an axis of inertia wherein the rotational axis and an axis of inertia mutually coincide.

10. A cutting device for cutting around an anus of an animal comprising:
    a positioning implement to position the cutting device, the positioning implement having at least one surface;
    a cutting implement to cut around the anus, the cutting implement having a cutting edge arranged about the positioning implement;
    a pressure implement comprising a conduit in the positioning implement, the pressure implement opening on a surface of the positioning implement;
    a suction implement comprising a conduit in the positioning implement, the suction implement opening into the space bounded by the cutting implement and the positioning implement wherein the pressure implement and the suction implement extend in an axial direction through the positioning implement and the pressure implement comprises a tube positioned within an axial bore in the positioning implement and the suction implement is bounded by the positioning implement and the axial tube.

11. The device of claim 10 wherein the pressure implement and the suction implement open at a mutual axial distance on the positioning implement.

12. The device of claim 10 wherein the positioning implement has a free end and the opening of the pressure implement is located between the free end of the positioning implement and the opening of the suction implement.

13. The device of claim 12 wherein the positioning implement has a rotation-symmetrical widening in the region of the opening of the pressure implement and in the region of the opening of the suction implement.

14. The device of claim 13 wherein the widening has a recess in the region of the opening of the pressure implement.

15. The device of claim 10 wherein the free end of the positioning implement has a smooth rounded shape.

16. The device of claim 15 wherein the free end has a rotation-symmetrical widening.

17. The device of claim 10 wherein the positioning implement and the cutting implement are fixedly coupled to one another.

18. The device of claim 10 wherein the cutting implement is rotatable.

19. The device of claim 18 further comprising a rotational axis and an axis of inertia wherein the rotational axis and an axis of inertia mutually coincide.

20. A cutting device for cutting around an anus of an animal comprising:
- a positioning implement for positioning the device about the anus of a slaughtered animal;
- a cylindrical knife having a free end, the free end having a cutting edge for cutting around the anus;
- a first pressure conveyance for creating a first pressure within the anus at a distance from the cutting edge; and
- a second pressure conveyance for creating a second pressure within a space bounded by the cylindrical knife wherein the first pressure conveyance comprises a tube positioned within the positioning implement and the second pressure conveyance is bounded by the positioning implement and the tube.

21. The device of claim 20 wherein the first pressure is greater than the ambient pressure.

22. The device of claim 20 wherein the second pressure is smaller than the ambient pressure.

23. The device of claim 20 wherein the positioning implement comprises a positioning rod for insertion into the anus of a animal.

24. The device of claim 23 wherein the tube has an opening on a peripheral surface of the positioning rod at a distance from the cutting edge and connectable to a first pressure source to generate a first pressure.

25. The device of claim 23 wherein the second pressure conveyance comprises a suction conduit extending through the positioning rod and opening on a space bounded by the cylindrical knife and connectable to a suction source to generate a suction at the opening.

26. The device of claim 23 wherein the positioning rod has a rotation-symmetrical widening in the region of the opening of the pressure conduit and in the region of the opening of the suction conduit.

27. The device of claim 20 wherein the cylindrical knife is rotatably drivable and positioned around the positioning rod, the knife having a free end, the free end having a cutting edge.

28. A cutting device for arranging a cut around the anus of an animal comprising:
- a rotatable cylindrical knife having a free end and a base, the free end having a cutting edge;
- a pressure conduit extending into a volume bounded by the free end, base and sides of the cylindrical knife, the conduit debounching in the volume, the conduit connectable to a pressure source to generate a pressure at the debounchment; and
- a suction conduit extending into the volume bounded by the free end, base and sides of the cylindrical knife, the conduit having an opening in the volume, the conduit connectable to a suction source to generate a suction at the opening wherein the pressure conduit is separate from and extends through the suction conduit thereby permitting the pressure conduit and suction conduit to operate simultaneously.

29. The device of claim 28 further comprising a positioning instrument to position the cylindrical knife around the anus.

30. The device of claim 29 wherein the cylindrical knife is arranged coaxially around the positioning instrument.

31. The device of claim 29 wherein the pressure conduit extends through the positioning instrument and debounches on a peripheral surface of the positioning instrument.

32. The device of claim 29 wherein the suction conduit extends through the positioning instrument and opens into a space bounded by the cylindrical knife.

33. The device of claim 29 wherein the positioning instrument has a rotation-symmetrical widening in the region of the debounchment of the pressure conduit and in the region of the opening of the suction conduit.

34. The device of claim 29 wherein the pressure conduit extends through the positioning instrument.

35. The device of claim 29 wherein the suction conduit extends through the positioning instrument.

36. The device of claim 28 wherein the rotational axis and the axis of inertia mutually coincide.

* * * * *